(No Model.)
F. A. REDMON.
WHEEL FOR BICYCLES.
No. 583,124. Patented May 25, 1897.
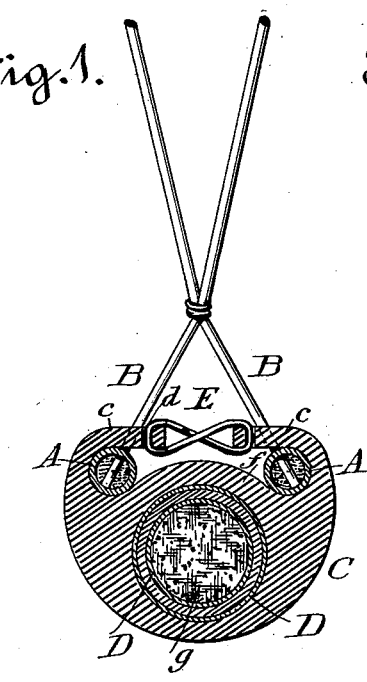
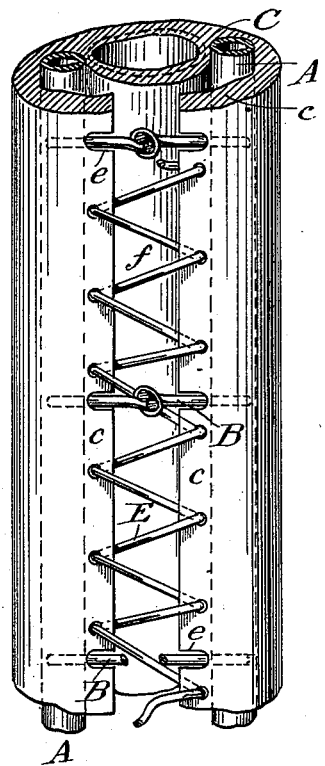
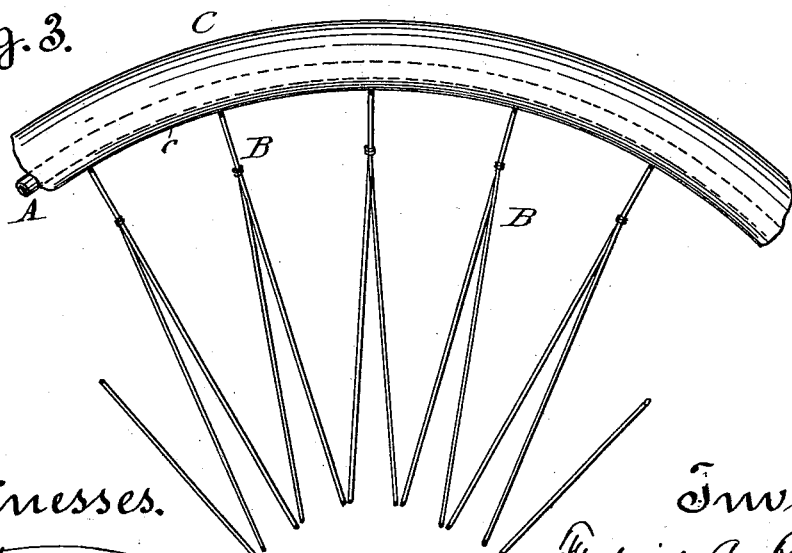
Witnesses.
Inventor.
Frederick A. Redmon
by Spear & Seely.
Attorneys

UNITED STATES PATENT OFFICE.

FREDERICK A. REDMON, OF SAN FRANCISCO, CALIFORNIA.

WHEEL FOR BICYCLES.

SPECIFICATION forming part of Letters Patent No. 583,124, dated May 25, 1897.

Application filed April 2, 1896. Serial No. 585,923. (No model.)

*To all whom it may concern:*

Be it known that I, FREDERICK A. REDMON, a citizen of the United States, residing at San Francisco, in the county of San Francisco and State of California, have invented certain new and useful Improvements in Wheels for Bicycles, &c.; and I do hereby declare that the following is a full, clear, and exact description thereof.

My invention relates to wheels for vehicles, and more particularly, although not exclusively, to wheels for bicycles.

My object is to do away with the pneumatic tire now commonly used without losing any of the advantages afforded by such a tire, while obviating all its disadvantages, which are many and serious.

Upon the introduction of the pneumatic tire its advantages were at once recognized, while its objectionable features were either ignored or were only gradually discovered. Increase of speed, ease in running, and reduction in weight were obtained at the sacrifice of durability, convenience, ability to control the wheel, and safety. The pneumatic tire, being filled with compressed air, collapses when punctured and is repaired with special means and implements and with more or less difficulty, and it is so frail that brakes quickly wear it out and, as a matter of fact, are not generally used at the present time. These are its main disadvantages.

By my manner of constructing the wheel I obtain the same elasticity, lightness, and ease of running, and also durability and convenience, as well as safety, since I can use tire-brakes without injury to the tire.

My invention is represented in the accompanying drawings, in which—

Figure 1 is a cross-section of the felly of the wheel with the tire attached. Fig. 2 is a plan view. Fig. 3 is a side elevation.

The felly of the wheel, instead of being a single rim, as usual, is composed of two parallel circular rods A A, which are preferably tubular, as shown. These tubes may be of very small diameter, and hence light. The spokes B may be either direct or tangent. In either case they are crossed a short distance above the tubes A and are tied at the intersection or otherwise secured together. The spokes are then connected to the rims in any suitable way; but where tubular rims are used I prefer to have each spoke penetrate the tube and seat itself against the opposite surface and to secure it by sweating with a heated iron. I have thus produced a wheel having a double rim which is capable of yielding a little laterally under pressure below the intersection of the spokes.

The tire C applied to this wheel may be either solid or hollow; but I prefer to construct it of tubular form and of soft rubber having strengthening-layers D of canvas, duck, or other strong textile material embedded in it. Whether solid or hollow the tire is provided with wings or flanges $c$. In applying the tire these flanges are folded over and above the rims and their edges are drawn toward each other and held in any convenient way, as by a lacing E and eyelets $d$ or lacing-studs. The edges of the flanges may be recessed, as shown at $e$, to avoid interference with the spokes. The tire is held in position without other means of fastening, since it is steadied by the broad bearing afforded by the double rim, and, since the general shape of the tire is circular, its upper part $f$ bears between the tubes and, in connection with the wings, prevents any side shifting. When the tire is made hollow, I prefer to fill it with pulverized cork or other light material $g$, although this is not essential.

In use my wheel possesses the natural and usual elasticity of the rubber tire; but added to this is the elasticity produced by the lateral yielding of the double rim. The result as to ease of running is substantially the same as with the pneumatic tire. In lightness my wheel, properly constructed, has a little advantage. In cheapness, taking the rims and tires together, the advantage is in my favor. Beyond these points no comparison is possible, because with the pneumatic tire the remaining characteristics are disadvantages; but it may be stated that my tire is strong and durable and can be cut and punctured like a solid tire without material injury, since such cuts are self-closing, that it can be easily and quickly applied to and removed from a wheel without special skill, and that it permits the use of the tire-brake, which is known to be the simplest and most effective and would always be employed if it were practicable.

I do not wish to deprive myself entirely of the right to use a pneumatic tire, because in light wheels for racing I can use my double rim in connection with such a tire, providing the latter with the side wings and securing it to the rims in substantially the same manner described. I can thus produce a lighter racing-wheel to be used under conditions in which the disadvantages of the pneumatic tire are not so pronounced.

It must be noticed that a tire of substantially the form shown could be applied to a single rim by carrying the flanges up over the edge of the rim and connecting them together. In this case the part $f$ of the tire would be seated in the groove of the rim.

What I claim is—

1. A suspension-wheel, having two laterally-yielding rims in combination with a single elastic tire connected to both rims.

2. A suspension-wheel, having two laterally-yielding rims, and a single elastic tire, having wings or flanges connected together above both rims.

3. A suspension-wheel consisting of a hub, wire spokes, two rims and a single elastic tire, the spokes being crossed and secured at the crossing, and the tire having wings or flanges connected together above the rims, substantially as described.

In testimony whereof I have affixed my signature, in presence of two witnesses, this 23d day of March, 1896.

FREDERICK A. REDMON.

Witnesses:
L. W. SEELY,
M. R. SEELY.